United States Patent [19]

DeBell et al.

[11] Patent Number: 5,248,869
[45] Date of Patent: Sep. 28, 1993

[54] COMPOSITE INSULATING WELD NUT LOCATING PIN

[75] Inventors: George C. DeBell, Plymouth; Richard L. Allor; Fred G. Oblinger, both of Livonia; Robert A. Pett, Franklin, all of Mich.

[73] Assignee: Ford Motor Company, Dearborn, Mich.

[21] Appl. No.: 917,262

[22] Filed: Jul. 23, 1992

[51] Int. Cl.⁵ .................. B23K 11/10; B23K 11/36
[52] U.S. Cl. .......................... 219/158; 219/93; 269/47
[58] Field of Search .............. 219/93, 119, 120, 158, 219/91.2; 29/467, 271, 281.5; 228/49.1; 269/47, 48, 52, 53; 428/367

[56] References Cited

U.S. PATENT DOCUMENTS

| 1,771,058 | 7/1930 | Pioch | 269/47 |
| 1,925,753 | 9/1933 | Fitch et al. | 219/93 |
| 2,623,974 | 12/1952 | Prucha | 219/93 |
| 2,731,535 | 1/1956 | Grey | 219/119 |
| 2,903,562 | 9/1959 | Emmons et al. | 219/93 |
| 3,219,790 | 11/1965 | Johnson | 219/93 |
| 3,573,423 | 4/1971 | Medlin | 219/119 |
| 3,657,509 | 4/1972 | Beucteau | 219/120 |
| 3,776,394 | 12/1973 | Miller | 414/755 |
| 3,906,607 | 9/1975 | Gusev | 29/281.5 |
| 3,918,694 | 11/1975 | Laudick | 269/47 |
| 4,609,805 | 9/1986 | Tobita et al. | 219/93 |

FOREIGN PATENT DOCUMENTS

| 3420660 | 12/1985 | Fed. Rep. of Germany | 29/281.5 |
| 288785 | 4/1991 | German Democratic Rep. | |
| 61-27185 | 2/1986 | Japan | 219/119 |
| 64-34583 | 2/1989 | Japan | 219/91.2 |
| 1-224175 | 9/1989 | Japan | 219/93 |

Primary Examiner—Geoffrey S. Evans
Attorney, Agent, or Firm—Roger L. May; Joseph W. Malleck

[57] ABSTRACT

A locating pin for positioning weld nuts relative to sheet metal pieces. The locating pin includes a heat and wear resistant ceramic base having a central opening. The locating pin also includes a heat and wear resistant elastomeric tip attached to the base by a shaft depending from the tip into the central opening of the base. The ceramic and elastomeric materials provide the locating pin with an electrically non-conducting characteristic.

20 Claims, 1 Drawing Sheet

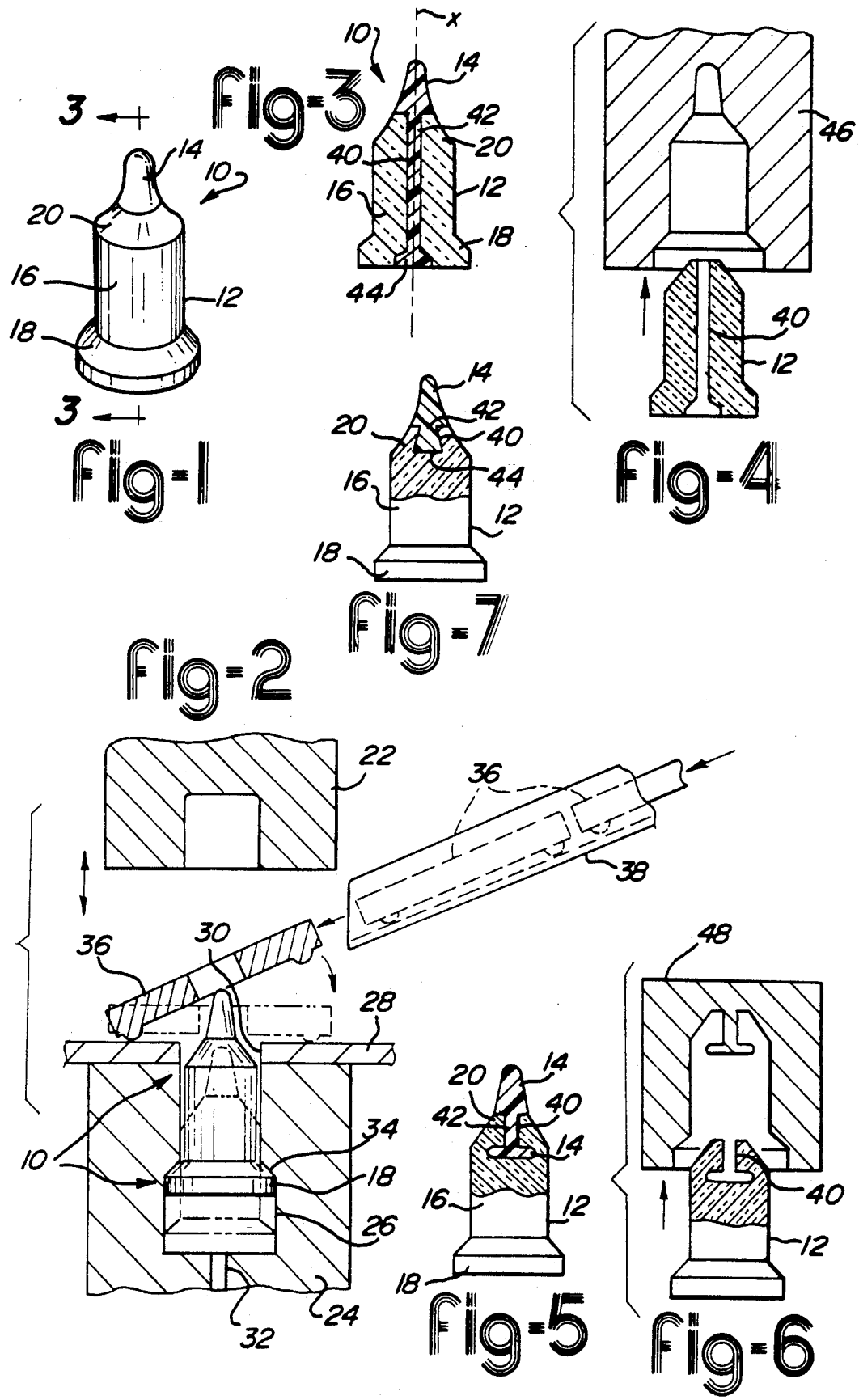

5,248,869

COMPOSITE INSULATING WELD NUT LOCATING PIN

TECHNICAL FIELD

This invention relates generally to a weld nut welding assembly. Specifically, this invention relates to an improved locating pin for such an assembly.

BACKGROUND ART

It is a common manufacturing practice to secure nuts directly to sheet metal pieces through a welding process. In the manufacture of motor vehicles today, there are virtually hundreds of applications for such "weld nuts" including various forms of bracketry, air bag supports, door parts and many others.

A variety of welding assemblies have been utilized for the production of weld nuts. One of the most common assemblies employs upper and lower welding units and a retractable steel locating pin. See, for example, U.S. Pat. No. 2,731,535 issued to Grey.

As discussed by Grey, in operation, a sheet metal piece with a preformed aperture is loaded on top of the lower welding unit such that the aperture is aligned directly over the locating pin recessed within the lower welding unit. The locating pin is then extended through the aperture of the sheet metal piece to capture a nut fed from a weld nut feeder positioned above and to one side of the locating pin. The nut is then centered about the locating pin over the aperture by the force of gravity. The upper welding unit then descends over the nut and a voltage differential is applied between the upper and lower welding units to fuse the nut to the sheet metal piece. Finally, the upper welding unit is withdrawn, the locating pin is retracted into the lower welding unit, and the sheet metal piece is removed from the welding assembly.

Significantly, this conventional type of welding assembly is known by those skilled in the art to suffer from two basic problems:

First, the electrical conductivity of the steel locating pin frequently causes arcing between the sheet metal workpiece and the locating pin during the actual welding process. As a result, the locating pin often becomes pitted and coated with a slag material that interferes with the extension and retraction of the locating pin within the lower welding unit. Eventually, the locating pin becomes inoperable and must be replaced, resulting in down time for the welding assembly, lost production, and increased labor. In fact, conventional steel locating pins generally require replacement on the order of once every eight hours.

Second, the design of the cavity within the lower welding unit in which the locating pin is housed often does not allow the tip of the locating pin to recede below the surface of the lower welding unit. As a result, the tip of the locating pin can occasionally collide with sheet metal pieces as they are loaded onto the lower welding unit. Repeated or particularly forceful collisions with sheet metal pieces result in the deformation of the tip of the locating pin. Such deformation may reduce or eliminate the effectiveness of the locating pin in capturing and retaining nuts fed from the weld nut feeder, once again necessitating replacement of the locating pin resulting in down time, lost production and additional labor. Constructing the locating pins from steel lessens this problem to some extent, but adds to the arcing problem discussed previously.

U.S. Pat. Nos. 2,623,974 and 2,903,562 issued to Prucha and Emmons et al., respectively, illustrate two attempted solutions to the arcing problem described above. U.S. Pat. No. 2,623,974 issued to Prucha discloses a partially insulated locating pin. Similarly, U.S. Pat. No. 2,903,562 issued to Emmons et al. discloses a locating pin in combination with a partially insulated metallic plunger. As disclosed by Emmons, the plunger acts to remove the locating pin from contact with the nut and sheet metal piece during the actual welding process. While both theses approaches serve to reduce arcing associated with the locating pin during the welding process, neither completely eliminates the problem. Indeed, arcing may still and often does occur over the air gaps between the uninsulated portions of the locating pin or plunger and the surfaces of the nuts and sheet metal pieces. Moreover, neither of these devices address the problem of physical deformation of the locating pin caused by collisions with the sheet metal pieces as they are loaded onto the lower welding unit.

U.S. Pat. Nos. 3,219,790 and 4,609,805 issued to Johnson and Tobita et al., respectively, disclose specialized electrodes as part of the upper and lower welding units that eliminate the need for a locating pin entirely. U.S. Pat. No. 3,219,790 issued to Johnson discloses upper and lower welding units adapted to orient and guide a nut directly over a sheet metal piece before welding the two together. However, this device requires specialized nuts to function properly. Additionally, it generally increases the costs associated with a welding assembly by virtue of its specialized electrodes and more complex method for feeding nuts into position for welding.

U.S. Pat. No. 4,609,805 issued to Tobita et al. also discloses specialized electrodes adapted to guide and hold a nut onto a sheet metal piece, as well as punch a hole in the sheet metal piece over which the nut is to be welded. This device also discloses insulating material to partially isolate a punch housed within the lower welding unit from the actual electrode of the lower welding unit. Once again, however, the Tobita device requires specialized nuts having grooves therein that cooperate with the punch housed in the lower welding unit. Additionally, the device will generally increases the costs associated with a welding assembly by virtue of its specialized electrodes and more complex method for feeding nuts into position for welding. Moreover, the problem of arcing may still occur over the air gap between the uninsulated portions of the punch and the lower electrode. Still further, Tobita discloses that the hole is punched from the sheet metal piece only after the nut and the sheet metal piece have been welded together. Thus, this device suffers from an inherent inefficiency since part of the weld joint must be broken to properly form the hole on the sheet metal piece.

SUMMARY OF THE INVENTION

The present invention provides a weld nut locating pin for positioning weld nuts relative to sheet metal pieces having preformed holes therein. The locating pin has a base constructed from wear and heat resistant ceramic material and a tip attached to the base and constructed from wear and heat resistant elastomeric material. In the preferred embodiment, the base has a central opening formed therein and the tip has a shaft extending within the central opening to secure the tip to the base.

Accordingly, a general object of the present invention is to provide a locating pin for positioning weld nuts on sheet metal pieces that can be used in conventional welding assemblies with conventional weld nuts.

Another general object of the present invention is to provide a locating pin for positioning weld nuts on sheet metal pieces that is wear and heat resistant to decrease replacement requirements and increase weld assembly efficiency.

Still a further general object of the present invention is to provide a locating pin for positioning weld nuts on sheet metal pieces that is simple in design and easily manufactured.

A principle object of the present invention is to provide a locating pin for positioning weld nuts on sheet metal pieces that is constructed from non conductive materials to eliminate arcing associated with conventional locating pins during the welding process.

Another more specific object of the present invention is to provide a locating pin for positioning weld nuts on sheet metal pieces that is resistant to deformation caused in conventional locating pins by the loading and unloading of sheet metal pieces in a welding assembly.

These and other objects, features and advantages of the present invention will be apparent after consideration of the following detailed description of the invention taken in connection with the accompanying drawings.

BRIEF DESCRIPTION OF THE DRAWINGS

FIG. 1 is a perspective view of the locating pin of the present invention;

FIG. 2 is a side elevation of the locating pin of the present invention shown during operation with a sheet metal piece, a weld nut feeder, and a welding assembly;

FIG. 3 is a cross-sectional view of the locating pin of the present invention taken along line 3—3 of FIG. 1;

FIG. 4 is a cross-sectional view of the base of the locating pin of the present invention together with a die used for molding the elastomeric tip of the locating pin of the present invention;

FIG. 5 is a partial cross sectional view of one alternative embodiment of the locating pin of the present invention taken along line 3—3 of FIG. 1;

FIG. 6 is a partial cross-sectional view of the base of one alternative embodiment of the locating pin of the present invention together with a die used for molding the base of this alternative embodiment of the locating pin of the present invention; and FIG. 7 is a partial cross sectional view of another alternative embodiment of the locating pin of the present invention taken along line 3—3 of FIG. 1.

DETAILED DESCRIPTION OF THE DRAWINGS

For ease in explanation, the locating pin 10 of the present invention will first be described in general terms and during operation with a welding assembly. A complete and detailed description follows thereafter.

Referring to FIG. 1, the locating pin 10 of the present invention is shown. The locating pin 10 has a composite construction comprising a ceramic base 12 attached to an elastomeric tip 14. In the preferred embodiment, the base 12 has a body portion 16 interposed between a retention flange 18 and a neck portion 20. The tip 14 is attached to the neck portion 20 of the base 12.

Referring now to FIG. 2, the locating pin 10 of the present invention is shown with a welding assembly having an upper welding unit 22 and a lower welding unit 24. In operation, The lower welding unit 24 has a chamber 26 that houses the locating pin 10. In the initial stages of operation, the locating pin 10, shown in phantom, is partially recessed within the chamber 26 of the lower welding unit 24. A sheet metal piece 28 having a preformed hole 30 therein is loaded onto the lower welding unit 24 such that the preformed hole 30 is aligned directly over the chamber 26 and the locating pin 10. The locating pin 10 is then partially extended from the chamber 26 through the preformed hole 30 of the sheet metal piece 28 by means of a pneumatic system (not shown). The pneumatic system forces pressurized air into the chamber 26 through an air source tube 32 positioned below the locating pin 10. The chamber 26 is also provided with a retention ring 34. The retention ring 34 cooperates with the retention flange 18 of the locating pin 10 to prevent the locating pin from exiting the chamber 26 when air pressure is applied to the locating pin 10 via the air source tube 32.

Still referring to FIG. 2, a weld nut 36 is fed by hand, or from a weld nut feeder 38 located above and to one side of the locating pin 10. The weld nut 36 is fed toward the locating pin 10 at such an angle that the hole within the weld nut 36 is captured by the tip 14 of the locating pin 10. The weld nut 36 then centers about the locating pin 10 over the preformed hole 30 in the sheet metal piece 28 by the force of gravity. The upper welding unit 22 then descends over the locating pin 10 to contact the weld nut 36. A voltage differential is applied between the upper welding unit 22 and the lower welding unit 24 by a voltage source (not shown) thereby causing the weld nut 36 to partially melt and fuse to the sheet metal piece 28. Finally, the pressurized air from the air source tube 32 is cut off, allowing the locating pin 10 to once again recede within the chamber 26 of the lower welding unit 24. The welded sheet metal piece 28 and weld nut 36 are then removed from the lower welding unit 24. The process may then be repeated as desired with additional sheet metal pieces 28 and weld nuts 36.

Referring now to FIGS. 1 and 3, the body portion 16 of the base 12 has a generally constant width and is preferably cylindrical in shape. The retention flange 18 is formed at one end of the body portion 12 and serves to retain the locating pin 10 within the lower welding unit 24 during operation of the welding assembly as previously described. The retention flange preferably comprises a lip circumscribing one end of the body portion 12. However, as is readily apparent, the retention flange 18 may be positioned at any point on the body portion 12 and may take a variety of shapes. The important feature of the retention flange 18 is that it have a generally greater width than that of the body portion 12 and have sufficient width and length to properly cooperate with the retention ring 34 of the lower welding unit 24.

The width of the retention flange 18 must be sufficient to resist tension forces on the locating pin 10 and prevent the locating pin 10 from exiting the lower welding unit 24 as a result of air pressure from the pneumatic system during operation of the welding assembly. The width of the retention flange 18 must also be sufficient to form a proper air seal when the retention ring 18 mates with the retention flange 34. The retention ring 18 must also have adequate width to prevent the locating pin 10 from lodging within the lower welding unit 24 as the retention ring 18 and the retention flange 34 begin to wear as a result of repeated contact.

The neck portion 20 is formed at the other end of the body portion 12 and has a generally decreasing width in a direction away from the body portion 12. The neck portion 20 preferably has an arcuate contour, but may also be frusto-conical in shape. The neck portion 20 primarily provides a smooth size transition from that of the body portion 16 of the base 12 to that of the tip 14.

The tip 14 is attached to the neck portion 20 of the base 12. As with the neck portion 20 of the base 12, the tip 14 also preferably has a generally decreasing width in a direction away from the neck portion 20. The tip 14 also preferably has an arcuate contour following that of the neck portion 20. Once again, however, the tip 14 may be frusto-conical, or even cylindrical, in shape. The exact shape and thickness of the tip 14 are not critical provided that the tip 14 properly captures the hole within the weld nut 36 as the weld nut 36 is fed toward the tip 14 from the weld nut feeder 38.

Referring now to FIG. 3, the preferred embodiment of the locating pin 10 of the present invention is shown in cross-section along the longitudinal axis, x. As depicted therein, the base 12 has formed along the longitudinal axis, x, a central opening 40 extending through the base 12 from the neck portion 20 to the retention flange 18. The central opening 40 has a generally constant width through both the neck portion 20 and the body portion 16 of the base 12. The central opening 40 has a width through the retention flange 18 of the base 12 that is generally greater than that through the body portion 16 and neck portion 20 of the base 12.

Still referring to FIG. 3, the tip 14 has an integral shaft 42 depending therefrom. The shaft 42 extends through the central opening 40 and has a tip retention flange 44 to secure the tip 14 to the base 12. The tip retention flange takes the form of a rib at the end of the shaft 42 opposite the tip 14. The shaft 42 has a width equal to that of the central opening 40 in the neck portion 20 and body portion 16 of the base 12.

As previously described, the width of the central opening 40 through the retention flange 18 of the base 12 is generally greater than the width of the central opening 40 through the body portion 16 and neck portion 20 of the base 12. The tip retention flange 44 has a width equal to the width of the central opening 40 through the retention flange 18 of the base 12. In such a manner, the central opening 40 and the tip retention flange 44 cooperate, or mate, to secure the tip 14 to the base 12. The tip retention flange 44 also resists tension forces on the tip 14 associated with the extension and retraction of the tip 14 within the lower welding unit 24 during the welding operation, and shear forces on the tip 14 associated with the loading of well nuts 36 that may otherwise cause the tip 14 to move or ride upward along the longitudinal axis, x.

Referring again to FIG. 2, the design of the chamber 26 within the lower welding unit 24 may not allow the locating pin 10 to completely recede below the surface of the lower welding unit 24. As a result, the sheet metal piece 28 may contact the tip 14 of the locating pin 10 during the loading or unloading of the sheet metal piece 28 onto or off of the lower welding unit 24. With conventional steel locating pins 10, such contact results in deformation of the tip 14 of the locating pin 10 and decreases or eliminates the ability of the tip 14 to adequately capture weld nuts 36 fed from the weld nut feeder 38. The present invention solves this problem through the use of elastomeric material in the construction of the tip 14 of the locating pin 10. Accordingly, the elastomeric material chosen for the tip 14 must be flexible and wear resistant enough to allow the tip 14 to withstand occasional impact with the sheet metal piece 28 without resulting in permanent deformation of the tip 14. By eliminating such deformation, the efficiency of the welding assembly is increased by increasing the overall lifespan of the locating pin 10 of the present invention. Additionally, the extension of the shaft 42 and tip retention flange 44 from the tip 14 into the base 12 allows the tip 14 to resist shear forces on the tip 14 associated with such collisions between the tip 14 and the sheet metal piece 28.

As previously described, the primary purpose of the tip 14 of the locating pin 10 is to capture the weld nut 36 as it is fed from the weld nut feeder 38. Accordingly, the elastomeric material chosen for the tip 14 must also be rigid enough to satisfactorily perform this function while simultaneously being resistant to wear associated therewith. Once again, the extension of the shaft 42 and tip retention flange 44 from the tip 14 into the base 12 allows the tip 14 to resist shear forces on the tip 14 associated with the capture of the weld nut 36.

Finally, the elastomeric material must also be resistant to the high temperatures associated with the welding process. Such temperatures are ordinarily on the order of 400° F. For this purpose, as well as those previously described, the elastomeric material of the tip 14 is preferably a cross-linked compound made with a fluoroelastomer. However, other elastomeric materials may also be used, such as fluorosilicon.

In conjunction with the elastomeric tip 14, the base 12 of the locating pin 10 is constructed from a ceramic material. As both these materials are electrically non-conductive, the final composite locating pin 10 of the present invention eliminates electrical arcing that occurs between conventional steel locating pins and the upper welding unit 22, lower welding unit 24, sheet metal piece 28, or weld nut 36 shown in FIG. 2. This elimination of electrical arcing prevents the associated pitting of the locating pin 10 and reduces the buildup of slag material on the surface of the locating pin 10 that eventually prohibits the free movement of the locating pin 10 within the chamber 26 of the lower welding unit 24. Moreover, slag material resulting from normal electrical arcing between a weld nut 36 and a sheet metal piece 28 is more easily wiped from the locating pin 10 of the present invention by virtue of the non-metallic materials used in construction. As a result, the lifespan of the locating pin 10 is once again greatly increased, thereby increasing the overall efficiency of the welding assembly.

The ceramic material chosen for the base 12 must be wear resistant to withstand the repeated contact between the retention flange 18 and the retention ring 34 of the lower welding unit 24. The ceramic material must also be resistant to the high temperatures associated with the welding process described above. To this end, the ceramic material of the base 12 is preferably impact resistant with a high fracture toughness such as partially stabilized zirconia or transformation toughened zirconia. These materials also feature low thermal conductivity, thus tending to insulate the elastomer used to form the tip 14, shaft 42 and retention flange 44 from the high temperatures associated with the welding process.

As previously indicated, the base 12 is formed having a central opening 40 extending therethrough along the longitudinal axis, x, of the base 12. The central opening 40 may be formed within the base 12 by drilling a hole along the longitudinal axis, x, of the base 12 with a first drill bit having a first diameter. Next, a second drill bit having a second diameter larger than the first diameter of the first drill bit is employed to drill a hole within the retention flange 18 of the base 12. The central opening 40 may be drilled using conventional drill bits prior to the sintering of the ceramic material used to form the base 12. After sintering, diamond core drill bits are required to properly form the central opening 40 within the base 12.

Alternatively, the central opening 40 may be formed within the base 12 by other conventional methods, including isostatic pressing, injection molding, a lost wax process or slip casting. In isostatic pressing, a mandril having the desired shape of the central opening 40 is placed within a rubber container and surrounded with powdered ceramic material. The rubber container is then subjected to pressure sufficient to form the powdered ceramic into the base 12 having the desired shape for the locating pin 10. The metal mandril and rubber container are then removed leaving the base 12 having a central opening 40 therein. Depending on the desired shape of the central opening 40, the mandril may have a rigid shape, or may be collapsible to allow for removal from the base 12 after pressing.

The injection molding process used to form the base 12 is similar to conventional plastic injection molding processes. A plastic binding agent is mixed with powdered ceramic materials and injected under high pressure into a mold having the desired shape. The binding agent is then removed, normally by vaporization.

The central opening 40 of the base 12 may also be formed via a lost wax process. This process for forming ceramics is similar to investment casting of metals. However, a water soluble wax is used and eliminated via a water wash rather than through melting.

Finally, the central opening 40 of the base 12 may be formed by a slip casting process. In slip casting, powdered ceramic material is mixed with a liquid, such as water, to form a slurry. The slurry is then poured into a porous mold having the desired shape. The liquid is then extracted and the mold removed. After sintering, the base 12 is ready for use in a locating pin 10 of the present invention.

Referring now to FIG. 4, the tip 14, shaft 42 and tip retention flange 44 are easily formed by placing the base 12 of the locating pin 10 within a die 46. The die 46 has the overall shape of the locating pin 10. In the preferred embodiment, the overall contour of the tip 14 follows that of the neck portion 20 of the base 12. Such contour matching necessitates a good surface to the die 46. After placing the base 12 within the die 46, an elastomeric material is introduced into the central opening 40 using a molding process well known in the art, such as injection, transfer, or compression molding. The elastomeric material may be introduced from either end of the die 46. As shown in FIG. 4, however, the elastomeric material is introduced into the central opening 40 from the end of the die 46 opposite where the tip 14 will be formed.

The die 46 is coated with a conventional die release material (not shown) to prevent the elastomeric material from sticking to the surface of the die 46. After the elastomeric material has sufficiently cooled for handling, the base 12 is withdrawn from the die 46. The finished locating pin 10 is then formed by shaving away any excess elastomeric material that may have formed about the neck portion 20 or retention flange 18 of the base 12.

Referring now to FIGS. 5-7, two alternative embodiments of the locating pin of the present invention are shown. In the embodiment depicted in FIG. 5, the central opening 40 extends only partially through the base 12. As a result, the tip retention flange 44 is located entirely within the base 12. As shown in FIG. 6, in this embodiment, the central opening 40 of the base 12 may be formed by the lost wax process previously described to mold a ceramic material about a die 48 having the desired shape. The central opening 40 may also be formed in this embodiment by isostatic pressing using a collapsible mandril. It should be readily apparent that the central opening 40 may be formed to accommodate the tip retention flange 44 of the shaft 42 at any location within the base 12. Moreover, multiple tip retention flanges 44 may be employed. As previously stated, the important feature of the tip retention flange 44 is that it have a generally larger width than that of the shaft 42 to properly resist tension and shear forces on the tip 14 during operation of the locating pin 10 within the welding assembly.

In the alternative embodiment of the locating pin 10 shown in FIG. 7, similar resistance to tension and shear forces on the tip 14 is accomplished by employing a tip retention flange 44 and central opening 40 having generally increasing widths, respectively, in a direction from the neck portion 20 toward the retention flange 18 of the base 12. Once again, in this embodiment, the base 12 may be formed by the previously described lost wax process, or isostatic pressing using a collapsible mandril. In either alternative embodiment of FIGS. 6 or 7, the tip 14, shaft 42 and tip retention flange 44 are again formed by any of the molding processes previously described. The only difference in the process being that the elastomeric material is injected from the end of the die 46 where the tip 14 will be formed.

It is to be understood that the embodiments of this invention as shown and described are preferred examples and that the invention is not to be limited to the exact arrangement of parts shown in the accompanying drawings or described in the specification. Various changes in the details of the construction and shape of the elements of the preferred embodiments may be made without departing from the spirit of the invention. The scope of the novel concepts of the invention are defined in the following claims.

We claim:

1. A locating pin for positioning weld nuts relative to sheet metal members having preformed holes, the locating pin comprising:
   a base composed of an electrically non-conductive material; and
   a tip attached to the base, the tip comprised of an electrically non-conductive elastic material.

2. The locating pin of claim 1 wherein the base comprises a retention flange, a body portion and a neck portion, the body portion interposed between the retention flange and the neck portion, the tip being attached to the neck portion of the base.

3. The locating pin of claim 1 wherein the base is comprised of a wear and heat resistant ceramic material.

4. The locating pin of claim 1 wherein the tip is comprised of a wear and heat resistant elastomeric material.

5. The locating pin of claim 1 wherein the base has a generally constant cross-sectional area in a direction away from the tip.

6. The locating pin of claim 1 wherein the base is substantially cylindrical in shape.

7. The locating pin of claim 1 wherein the tip has a generally decreasing cross-sectional area in a direction away from the base.

8. The locating pin of claim 1 wherein the tip is substantially frusto-conical in shape.

9. The locating pin of claim 2 wherein the body portion has a generally constant cross-sectional area in a direction away from the neck portion.

10. The locating pin of claim 2 wherein the body portion is substantially cylindrical in shape.

11. The locating pin of claim 2 wherein the neck portion has a generally decreasing cross-sectional area in a direction away from the body portion toward the tip.

12. The locating pin of claim 2 wherein the neck portion is substantially frusto-conical in shape.

13. The locating pin of claim 2 wherein the tip has a generally constant cross-sectional area in a direction away from the neck portion.

14. The locating pin of claim 2 wherein the tip is substantially cylindrical in shape.

15. The locating pin of claim 2 wherein the retention flange comprises a lip circumscribing the body portion.

16. The locating pin of claim 2 wherein the retention flange, body portion and neck portion are of integral construction.

17. A composite locating pin for positioning weld nuts relative to sheet metal members having preformed holes, the locating pin comprising:

a ceramic base having a central opening formed therein, the base having a retention flange comprising a lip circumscribing a first end of the base; and an elastomeric tip attached to a second end of the base and having an integral shaft depending therefrom, the shaft extending into the central opening of the base and having a tip retention flange comprising a rib circumscribing the shaft within the central opening.

18. The locating pin of claim 17 wherein the base has a generally constant cross-sectional area in a direction away from the tip.

19. The locating pin of claim 17 wherein the tip has a generally decreasing cross-sectional area in a direction away from the base.

20. A composite locating pin for positioning weld nuts relative to sheet metal members having preformed holes, the locating pin comprising:

a ceramic base having a central opening formed therein, the base having a body portion, a neck portion and a retention flange, the body portion interposed between the retention flange and the neck portion and having a generally constant cross-sectional area, the neck portion having a generally decreasing cross-sectional area in a direction away from the body portion, and the retention flange comprising a lip circumscribing the body portion; and an elastomeric tip attached to the neck portion of the base and having an integral shaft depending therefrom, the shaft extending into the central opening of the base and having a tip retention flange comprising a rib circumscribing the shaft within the central opening.

* * * * *